Aug. 20, 1940.  H. M. KNOTH  2,211,898
BEARING
Filed Sept. 29, 1939
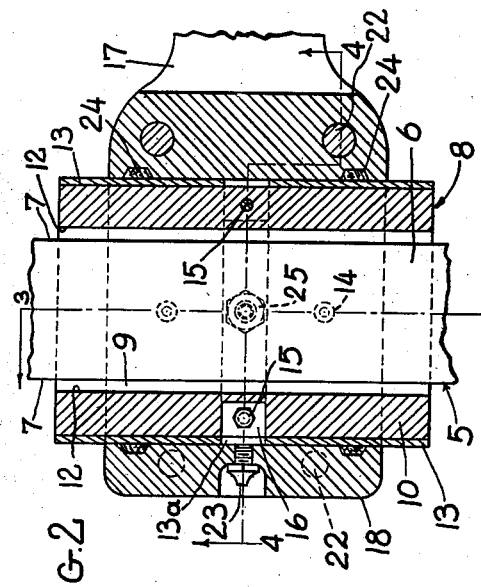
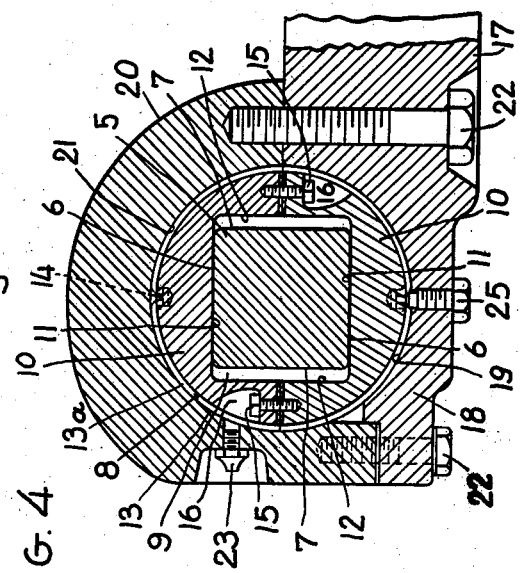
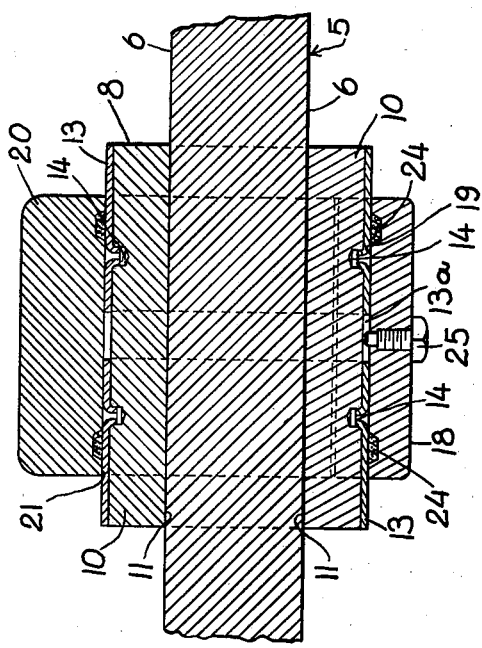
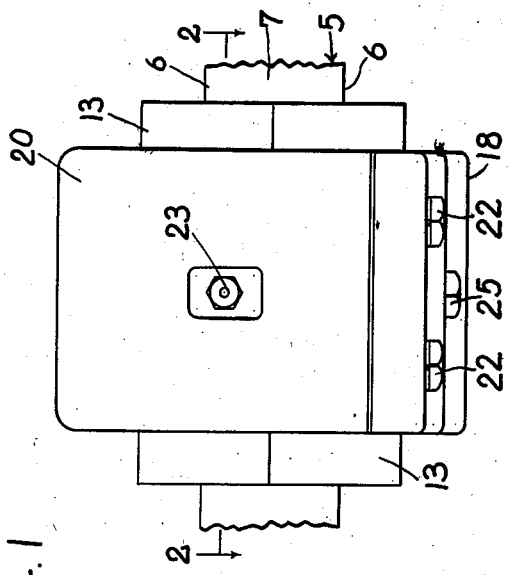
INVENTOR
H.M. KNOTH
BY *Paul O. Pippel*
ATTY.

Patented Aug. 20, 1940

2,211,898

UNITED STATES PATENT OFFICE 2,211,898

BEARING

Harold M. Knoth, Chicago, Ill., assignor to International Harvester Company, a corporation of New Jersey Application September 29, 1939, Serial No. 297,155

3 Claims. (Cl. 308—3)

This invention relates to a bearing and more particularly to an improved bearing construction for the torque brace of a track type tractor.

The particular use for which the bearing herein provided is especially adapted is in the torque brace structure of a track type tractor wherein the body of the tractor carries a transversely extending support to which one end of the torque brace is connected. The other end of the brace is rigidly secured to one of the opposite track frames carried by the tractor body. These frames are carried for vertical movement with respect to the tractor about a horizontal pivot axis generally coincident with the center of the aforesaid support. It is necessary, therefore, that the brace member and support be interconnected for relative angular movement about said support as the track frames rise and fall. A particular type of torque brace construction generally employed in track type tractors is shown in Patent No. 2,135,619 issued Nov. 8, 1938. The functional and structural relationships between the support and torque braces are found to be enhanced by a connection between the braces and support permitting not only relative angular movement but also relative sliding movement.

The principal object of the present invention, then, is to provide an improved bearing especially adapted for use in structures such as those referred to above.

An important object is to provide a bearing having improved facilities for lubrication thereof.

Another object is to arrange the bearing as an interconnection means between a pair of relatively movable members, so that relative angular and sliding movement is permitted.

And, another object is to arrange the members in a manner preventing undesirable relative movement therebetween.

Briefly, these and other desirable objects are achieved in one preferred form of the invention by the provision of a bearing element which is generally circular in cross-section and which has a central, rectangular opening therethrough. Opposite inner faces of this opening provide bearing surfaces cooperable with the opposite bearing surfaces provided on a support which is also generally rectangular in cross-section, the area of the cross-section of the support being smaller than that of the opening, so that the parts may have relative sliding movement in the direction of the shorter dimension of the cross-section of the support. The outer surface of the bearing provides a cylindrical bearing surface, about which a brace member, or the like, may have angular or swinging movement. Another feature of the invention consists in providing the bearing surface with a peripheral groove and in providing the brace member with a lubricant supply means generally in alinement with said groove. Means are provided upon the brace member and the bearing member to prevent relative displacement therebetween.

A more complete understanding of the objects and desirable features of the invention may be had from the following detailed description taken in conjunction with the accompanying sheet of drawings, in which:

Figure 1 is a rear elevational view of the improved bearing;

Figure 2 is a sectional view taken substantially along the line 2—2 of Figure 1;

Figure 3 is a sectional view taken along the line 3—3 of Figure 2; and,

Figure 4 is a sectional view taken along the line 4—4 of Figure 2.

In a track type tractor of the class referred to above and as shown in the patent above mentioned, there is provided a transverse support to which one end of a torque brace is connected. The present drawing illustrates only one form of support, and the remaining tractor and torque brace structures are omitted, since the function thereof is well understood by those skilled in the art.

The improved bearing chosen for the purposes of illustration is shown as utilized in connection with a support 5, rectangular in cross-section and provided with opposite flat bearing surfaces 6 and opposite stop faces 7. A bearing element 8, generally circular in cross-section and provided with a rectangular opening 9, is carried on the support 5 for slidable movement with respect thereto. This bearing is preferably formed as two complementary halves 10 secured together about the support. Opposite faces of the rectangular opening 9 provide bearing surfaces 11 respectively slidably associated with the bearing surfaces 6 of the support. The remaining two faces of the rectangular opening serve as complementary stop faces 12 respectively engageable with the stop faces 7 of the support. The cross-sectional area of the support 5, as will be seen, is less than the corresponding area of the rectangular opening 9, the bearing surfaces 6 being thus shorter than the bearing surfaces 11. This provision enables the support and the bearing to have relative sliding movement limited in both directions by engagement between the stop faces 7 and 12 of the support and bearing, respectively. This sliding movement is across the shorter dimension of the support.

The outer surface of the bearing 8 is generally cylindrical. This surface is fitted with a pair of bushings or bearings 13 which are arranged on the shaft with their inner or proximate ends in axially spaced relation to form a peripheral groove or space 13a. Each of the bushings is provided with one or more inwardly extending projections 14 engageable with small bores in the bearing element 8, this feature providing for fixedly mounting the bushings on the bearing. The two complementary halves 10 of the bearing 8 are secured together about the support 5 by a pair of bolts 15. Each bearing half is provided with a recess 16 open to the cylindrical surface of the bearing and accommodating the respective bolt head within the periphery of said surface. These recesses are disposed generally in a plane passed through the bearing at right angles to the axis thereof and generally in alinement with the space 13a provided between the spaced-apart proximate ends of the bushings 13. Since each bushing is preferably formed as a pair of complementary halves, it will be seen that the bushings do not interfere with ready removal of the bolts 15 from the bearing 8.

The rear end of a torque brace member is illustrated in the drawing at 17. This end portion is bifurcated, and each furcation embraces a portion of the cylindrical bearing surface formed by the bushings 13. The brace member 17 is preferably formed with an extending portion 18 having an inner curved surface 19 providing a bearing surface cooperating with the lower portion of the aforesaid cylindrical bearing surface. A cap member 20 is provided with an inner curved bearing surface 21 cooperating with another portion of said cylindrical surface, the surfaces 19 and 21 providing generally a cylindrical bearing surface inside the end of the member 17. The cap 20 is rigidly secured to the end portion 18 of the member 17 by a plurality of bolts 22. It will thus be seen that the member 17 may have angular or swinging movement with respect to both the support and the bearing 8, but may have relative sliding movement with respect to the support only. The brace member may also have sliding movement axially of the support according to the amount of movement provided by the interconnection between the members 17 and the track frames connected to the tractor. Without such limitation the brace and support may be said to have generally free relative movement axially of the support.

As previously mentioned, the groove or space 13a provided between the inner or proximate ends of the bushings 13 is in alinement with the recesses 16 formed in the bearing halves 10. The brace member 17 is provided with lubricating means in the form of a lubricant fitting 23 carried in the cap member 20 generally in alinement with the recesses 16 and the groove or space. This provision enables lubricant to be supplied through the fitting to the recesses and space, and thus a sufficient quantity of lubricant may be retained within the bearing assembly to last over a comparatively long period for lubricating the cylindrical bearing surfaces between the brace member and the bearing. The bottom or end portion 18 of the brace member 17 and the cap member 20 are provided respectively with a pair of complementary lubricant seals 24 to insure the retention of lubricant and to prevent entrance of dust into the assembly.

The brace member 17 further includes means to prevent axial displacement between the brace and the bearing 8. This means is preferably in the form of a stud or bolt 25 threaded into the portion 18 of the brace and extending into the groove or space 13a between the bushings. The reduced end portion of the stud does not engage the bearing so as to prevent relative angular movement between the brace and bearing, but is engageable with either of the proximate ends of the bushings to prevent undesirable axial movement of the bearing 8 with respect to the brace. It will be seen that this movement is prevented by the engagement between the bushings 13 and the stud 25 because the bushings are fixedly carried by the bearing at 14, as previously described.

The bearing 8 may be easily assembled into or removed from the brace 17 in the following manner:

The bolts 22 are loosened sufficiently to release the bearing engagement between the brace and the cylindrical bearing surface of the bearing. The stud 25 is then backed off until the end thereof is free of the bushings 13. The bearing can then be moved axially of the support until free of the brace. The bolts 15 may be then removed and the bearing halves taken off the support. The above procedure provides a quick and easy method of assembling and disassembling the bearing construction. It will be noted that it is not necessary to remove the cap 20 entirely from the brace 17. The bearing halves 10 may be restored quickly to position.

From the foregoing description it will be seen that an improved bearing construction has been provided according to the purposes of the invention. It will be understood, of course, that only a preferred embodiment and one use of the invention have been illustrated and described and that numerous modifications and alterations may be made therein, and other uses made thereof, without departing from the spirit and scope of the invention as defined in the appended claims.

What is claimed is:

1. In combination, a support having opposite, flat surfaces, a brace member and a bearing element connecting the member and support, said bearing comprising two complementary halves fitted together to embrace the support and each having an inner flat surface slidably associated with the respective flat surface of the support, each half further including an outer curved surface, the two curved surfaces when the halves are fitted together forming a generally cylindrical bearing surface, a bolt securing said halves together, one of the halves being recessed to accommodate the bolt head within the curved surface, the brace member being arranged with respect to the element for angular movement about the cylindrical surface, and a lubricant fitting carried by the brace member generally in alinement with said recess.

2. In combination, a support, a member, and a bearing element connecting the support and member, said element embracing the support and comprising a pair of complementary halves fitted together and each having an outer curved bearing surface, said surfaces when the halves are fitted together forming a generally cylindrical bearing surface, a bolt securing said halves together, one of said halves having a recess at its curved surface to accommodate the bolt head within the periphery of the cylindrical surface, a pair of bushings encircling the cylindrical surface and having their proximate ends axially spaced apart in alinement with the recess, the brace member embracing the bushings and the bearing element for angular movement about the cylindrical bearing surface, and lubricant means associated with the brace member generally in alinement with the aforesaid space between the bushings.

3. In combination, a support generally rectangular in cross-section and having opposite, flat bearing surfaces, the other two surfaces providing stop faces, a bearing element generally circular in cross-section and having a central, rectangular opening embracing the support and having opposite, inner bearing faces and opposite inner stop faces, the bearing faces being longer than the support bearing faces, the support and the bearing thereby being relatively slidable within the limits of engagement between the respective opposite stop faces, the outer surface of the bearing element providing a cylindrical bearing surface, and a brace member embracing the bearing element and having angular movement with respect thereto about said cylindrical surface.

HAROLD M. KNOTH.